C. B. LARZELERE.
POLYPHASE RELAY.
APPLICATION FILED JULY 13, 1917.

1,315,780.

Patented Sept. 9, 1919.
2 SHEETS—SHEET 1.

Inventor:
Charles B. Larzelere,
by Albert G. Davis
His Attorney.

C. B. LARZELERE.
POLYPHASE RELAY.
APPLICATION FILED JULY 13, 1917.
1,315,780.
Patented Sept. 9, 1919.
2 SHEETS—SHEET 2.
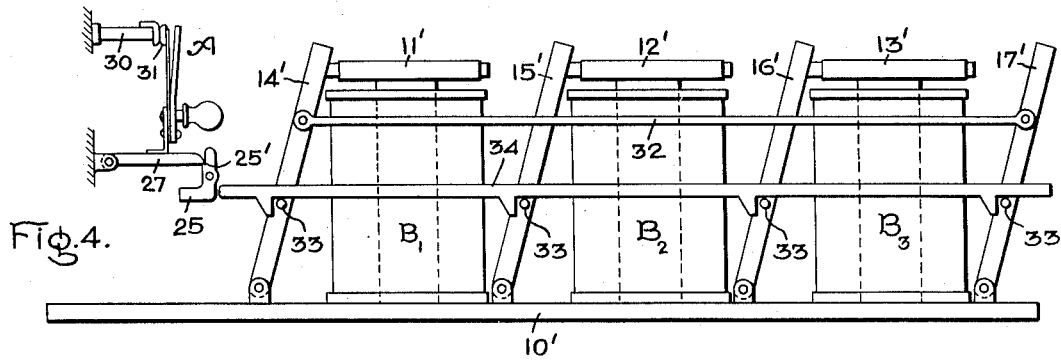
Fig. 4.
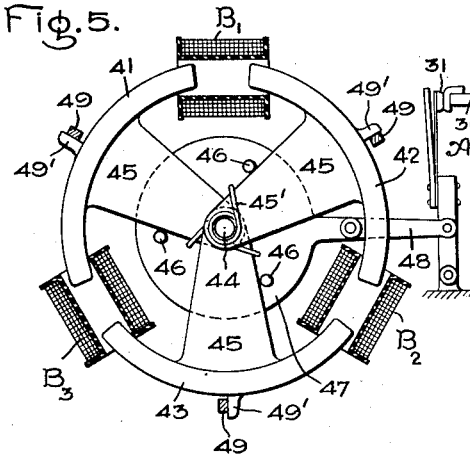
Fig. 5.
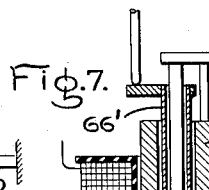
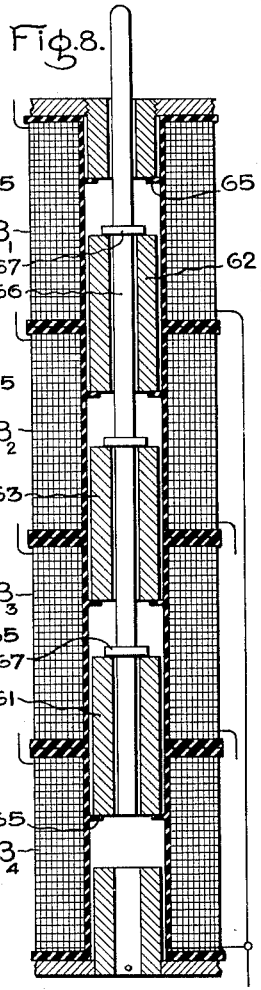
Fig. 7. Fig. 8.
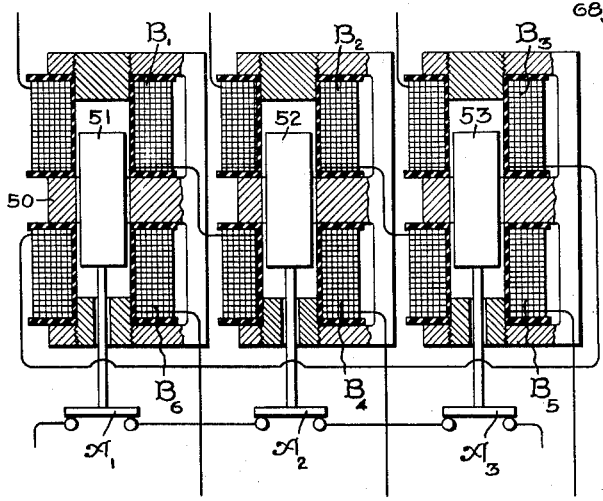
Fig. 6.
Inventor:
Charles B. Larzelere,
by Albert G. Davis
His Attorney.

in# UNITED STATES PATENT OFFICE.

CHARLES B. LARZELERE, OF SCHENECTADY, NEW YORK, ASSIGNOR TO GENERAL ELECTRIC COMPANY, A CORPORATION OF NEW YORK.

POLYPHASE RELAY.

1,315,780.

Specification of Letters Patent.

Patented Sept. 9, 1919.

Application filed July 13, 1917. Serial No. 180,472.

*To all whom it may concern:*

Be it known that I, CHARLES B. LARZELERE, a citizen of the United States, residing at Schenectady, county of Schenectady, State of New York, have invented certain new and useful Improvements in Polyphase Relays, of which the following is a specification.

My invention relates to polyphase switches and has for its object the provision of improved means for opening a polyphase circuit when the phases become unbalanced, caused for instance, by the blowing of a fuse, the opening of a safety device in one phase or the failure of current in any phase of a polyphase circuit.

In carrying out my invention, I provide a device which is actuated upon phase unbalancing to actuate a tripping device or control circuit of a main circuit breaker. In one form of my invention, I provide a relay which is designed to be in stable equilibrium during the balanced conditions of the phases but responds directly to an overpowering attraction and exerts a vigorous force when an unbalanced phase condition arises. To insure the condition of stable equilibrium, the moving magnetic members of my relay are biased in their normal positions so as to prevent the operation of the relay in response to slight variations of current in any phase of the polyphase circuit, thereby securing a very reliable operation. I further provide a relay which will respond quickly and positively to an unbalanced condition and which at the same time is simple and rugged in construction.

Figure 1:
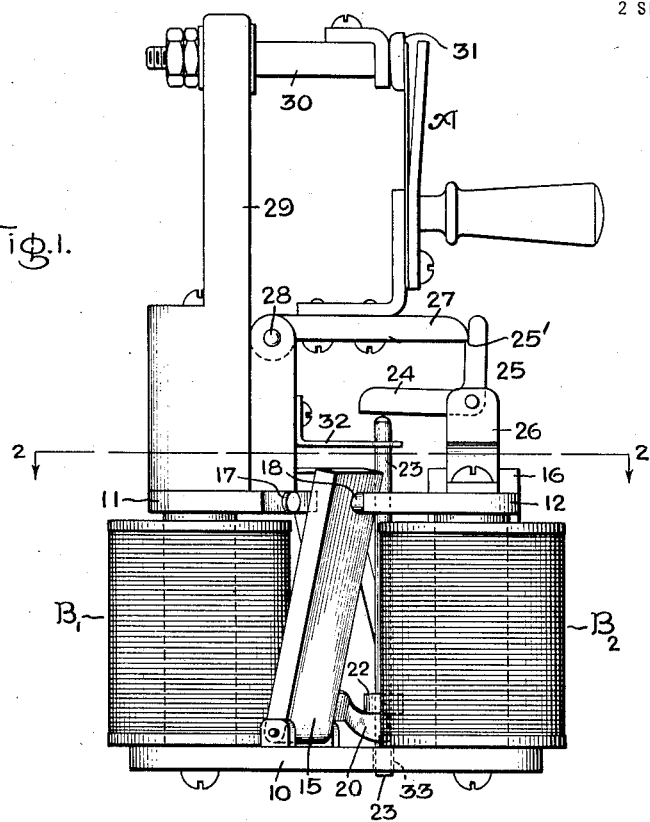
Figure 2:
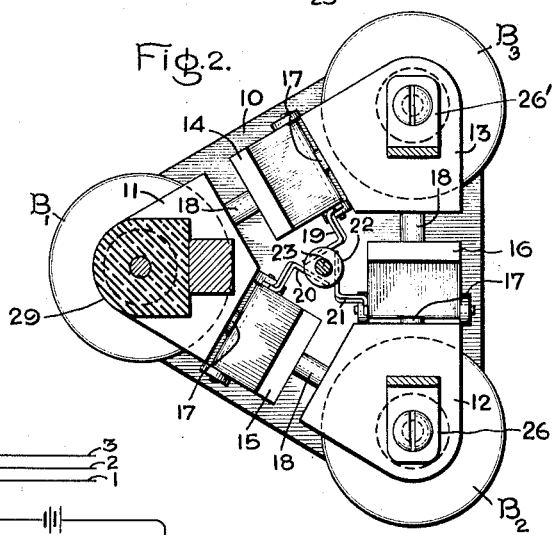

Further objects of my invention will appear and a complete understanding thereof may be had from the following detailed description taken in connection with the accompanying drawings, in which Figure 1 is a side elevation of a relay constructed in accordance with my invention; Fig. 2 is a sectional view thereof taken on line 2—2 of Fig. 1; while Fig. 3 is a diagrammatic view showing the operative relation of my relay to the supply circuits for a motor, and Figs. 4 to 8 show modified forms of my invention.

Figure 3:
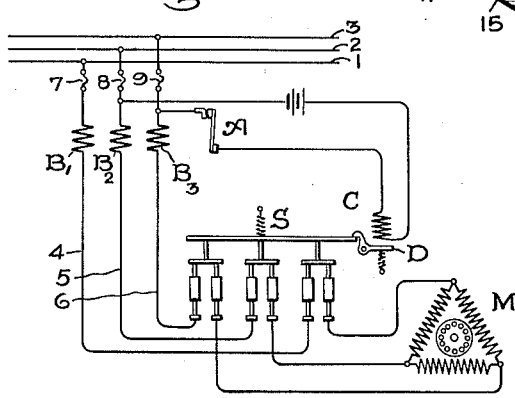

Referring now to Fig. 3, 1, 2 and 3 denote the supply mains supplying three-phase alternating current to the branch circuits 4, 5 and 6 leading to the motor M through the control switch S which is biased to open position. The circuits 4, 5 and 6 are provided with fuses 7, 8 and 9 and each has a magnetic winding or coil of my improved relay in series therewith, shown at $B_1$, $B_2$ and $B_3$. The relay is arranged to control the energization of the coil or electromagnet C through the operation of switch A in the holding coil circuit. The coil C is shown, by way of example, as retaining the latching means or detent D in engagement with the movable part of control switch S, when energized, so as to hold the switch closed.

In the form of relay shown in Fig. 1, the coils $B_1$, $B_2$ and $B_3$ of the relay are shown mounted on the base 10, each coil having suitable magnetic cores surmounted by pole-pieces 11, 12 and 13 respectively. These pole-pieces may conveniently be of a quadrilateral shape, two sides of each being adapted to coöperate with movable magnetic members, as armatures 14, 15 and 16, which, in this instance, are pivoted to the base 10. In order to properly space the armatures 14, 15 and 16 from their respective pole-pieces 11, 12 and 13 so as to prevent their sticking to them when attached by the overpowering attraction of the adjacent coil, I have provided each pole-piece with projections of non-magnetic material 17 and 18, the latter being the ones against which the armatures normally lie and are therefore made longer than the projections 17.

The armatures 14, 15 and 16 are provided with projecting fingers 19, 20 and 21 respectively which engage a collar 22 on pin 23 and move the latter longitudinally. This pin when moved upwardly by any one of the fingers, engages arm 24 of detent 25 (pivoted between two members 26 and 26') which may be conveniently secured to pole pieces 12 and 13. The detent 25 has a shoulder 25' against which member 27 of switch A bears and by which it is held in closed position. Member 27 is pivoted at 28 to the standard 29, which is secured to the third pole-piece 11 and is made to carry the fixed contact member 30 of switch A suitably insulated therefrom. The movable member 31 of switch A carried by arm 27 engages with contact 30 to complete a circuit through the electromagnet C. The part 31 is preferably secured in a resilient manner to the rigid part of switch A.

In order to insure that pin 23 will properly engage with the detent 25, it may be provided with guides, such as member 32.

secured to a portion of standard 29 and may be movable through an opening 33 in the base 10.

The operation of this form of device is as follows:

When substantially equal currents are flowing through coils $B_1$, $B_2$ and $B_3$ (and consequently in the phases of the polyphase circuit), the three fluxes engendered thereby in the coils will retain the armatures 14, 15 and 16 in their normal biased positions against projections 18. If, now, for any reasons, the phases become unbalanced so that the current flowing in one coil, say $B_1$, becomes materially less than that which flows in the other two, or ceases altogether, then the armature 14 of coil $B_1$ will no longer be attracted so as to rest against the stop on pole-piece 11, but will be attracted by the over-powering flux from pole-piece 13 of the adjacent coil $B_3$.

The movement of armature 14 in response to the overpowering attraction of coil $B_3$ will cause the finger 19 to raise pin 23.

When pin 23 is raised, it will disengage the detent 25 from holding engagement with member 27 so that switch A will open its circuit and deënergize electromagnet C, whereupon the switch will open to cut off the load from the unbalanced circuit.

In the modified form shown in Fig. 4, the coils $B_1$, $B_2$ and $B_3$ are mounted upon base 10' one behind the other or in alinement, being provided with pole-pieces 11', 12' and 13' and armatures 14', 15', 16' respectively. These armatures are biased to normally lie against their respective pole-pieces as in the arrangement shown in Fig. 1.

In order that armature 14' may be influenced by magnetic flux from coil $B_3$ as in the previously described form of device, I provide an auxiliary armature 17' adjacent to coil $B_3$ but biased to normally lie away from its pole-piece and connected to armature 15' by link 32.

In this form, instead of levers, the armatures are provided with projections 33 adapted to engage with rod or tripping member 34, which rod, when moved by any armature, will disengage detent 25 to open switch A.

The operation of this form is similar to that in Fig. 1, for it is seen that if current should fail in coil $B_1$, it could no longer retain its armature 14' in engagement with its pole-piece 11, for the over-powering attraction of coil $B_3$ would attract armature 17' so as to push armature 14' away from its pole-piece 11', which armature movement would move rod 34 to disengage the detent 25 to open switch A.

In the form of device shown in Fig. 5, the coils $B_1$, $B_2$ and $B_3$ are so disposed that their axes lie tangent to a circle. In this form, instead of armatures, I use movable cores 41, 42 and 43 pivoted at 44 and held in mechanical equilibrium by the equal opposing magnetic forces of the coils acting on the ends of the cores.

The radial members 45 of the cores 41, 42 and 43 are adapted to engage with pins 46, disposed in the same order with respect to members 45, on disk 47, which disk is also pivoted at 44. The disk 47 is connected by link 48 with switch A so that the rotary movement of disk 47 caused by cores 41, 42 or 43 will open this switch.

To prevent the movement of the cores 41, 42 and 43 in the direction which causes no motion of the disk 47, I have provided the stops 49 which are arranged to be engaged by suitably disposed lugs 49' on the cores. In order to bias the cores in their normal operative positions, I have provided spring members 45' which are shown coiled about pivot 44 adapted to engage the radial members 45 and press the cores against the stops 49.

The mode of operation of this form of device is such that if current should fail in any coil, as $B_1$, the movable cores 41 and 42 are no longer held in equilibrium but are attracted by the adjacent coils $B_2$ and $B_3$, the coil $B_3$ moving core 41 so as to engage a pin 46 and turn disk 47 to open switch A.

In the form of device shown in Fig. 6, I have still used movable cores, instead of biased armatures, to be held in equilibrium by coils disposed with their axes parallel. In order to get an opposing force from each coil as $B_1$, $B_2$ and $B_3$ to act on the movable cores 51, 52 and 53, respectively, I have displaced a portion of the winding of each coil so as to form, as it were, separate coils $B_4$, $B_5$ and $B_6$ associated respectively with coils $B_2$, $B_3$ and $B_1$.

The coils are mounted on a convenient member, such as 50, the coils $B_1$ and $B_6$, when energized, exerting opposing forces on core 51, the core being biased by gravity against a stop such as switch $A_1$ which is held closed while the core is in equilibrium. Coils $B_2$ and $B_4$ and coils $B_3$ and $B_5$ similarly control cores 52 and 53, which move switches $A_2$ and $A_3$, these switches being biased likewise by gravity to closed position.

The operation of this form of device is such that upon failure of current in one phase, say that including coils $B_1$ and $B_4$, cores 51 and 52 are no longer held in equilibrium. The upward magnetic pull on core 52 due to coil $B_2$ will open switch $A_2$ and deënergize the holding circuit, core 51 remaining stationary because there is no upward pull on this core.

In the forms shown in Figs. 7 and 8, I have employed a coaxial arrangement of the coils $B_1$, $B_2$ and $B_3$. I have used annular cores 61, 62 and 63 normally resting on projections 65 disposed interiorly on the upper portion of the spools holding the windings of the coils. The projections 65 are so located that they serve as stops for cores 61, 62 and 63 against which they are biased in positions of stable equilibrium.

Within the annular cores 61, 62 and 63 is slidably disposed a sleeve or pin 66 provided with projections, as 67, to be engaged by the cores when moved from positions of equilibrium by an unbalanced phase condition.

In Fig. 7 where but three coils are used, while cores 62 and 63 are subject to opposing forces, I have found it necessary to link the auxiliary core 64 to core 61 by means of link 68 so that it will be subject to opposing forces. This link 68 may conveniently pass through sleeve 66.

Instead of providing an auxiliary core, as in Fig. 7, I may provide an auxiliary coil $B_4$ (see Fig. 8) in series with $B_1$ to supply the opposing magnetic force needed to hold the core, in this instance, core 61 which lacked symmetric disposition, in a position of equilibrium with respect to the coils.

The mode of operation of these forms of device is such that if current should fail in one phase, say that including coil $B_1$, core 61 would no longer be constrained in its position of equilibrium by reason of the magnetic attraction of coil $B_3$.

In Fig. 7 the coil $B_3$ indirectly raises core 61 upon failure of current in coil B, by raising auxiliary core 64 which transmits its motion to core 61 by link 68 the former engaging a projection 67 on sleeve 66' for disengaging the holding means to permit the control switch to open.

In Fig. 8 a failure of current in coil B, is accompanied by a failure of current in coil $B_4$ because it is in series with it. This permits coil $B_3$ to directly raise core 61 so as to engage projection 67 to raise pin 66 for disengaging the holding means to permit the control switch to open.

It will thus be seen that while I have described in detail several forms of my invention which involve a moving part held in mechanical equilibrium by opposing magnetic forces set up by currents of balanced phases, these forms are merely illustrative, being the best means at present known to me incorporating my invention, but I would have it understood that I do not mean to be limited thereby in the choice of mechanical equivalents and in the embodiment of means to an end except as defined in my claims hereunto appended.

What I claim as new and desire to secure by Letters Patent of the United States, is:

1. The combination with a polyphase circuit, of means for opening the same upon the unbalancing of the phases comprising a magnetizing winding in each phase, and a single independent member coöperating with each winding and separately movable thereby to open the circuit, each of said members being normally held against movement by one of the other windings.

2. The combination with a circuit interrupting device, of means for opening said device upon phase unbalancing comprising a winding corresponding to each phase of said circuit, a separate member movable in response to each winding to operate said interrupting device, said windings being positioned intermediate said members so that each member is normally held against movement by one of said other windings.

3. The combination with a polyphase circuit, of means for opening the same, a coil in each phase, single magnetic members corresponding to each coil disposed intermediate said coils in position to be held against movement by one of said coils and arranged to individually actuate said circuit opening means upon unbalancing of said phases.

4. The combination with a polyphase circuit, of means for opening the same, a coil in each phase, and movable magnetic members biased in positions of stable equilibrium intermediate said coils so as to be controlled by opposing magnetic attractions, and a common tripping member actuated by any of said magnetic members.

5. The combination with a polyphase circuit, of means for opening the same, a coil in series with each phase, a pole piece for each coil, movable magnetic members disposed between said coils, each member being normally biased to lie against one pole piece and arranged to individually actuate said circuit opening means upon the unbalancing of said phases.

6. The combination with a polyphase circuit, of means for opening the same comprising a control switch, and tripping means therefor, magnetizing windings in each phase, and members intermediate said windings, each of said members being moved by one of said windings to operate said tripping means upon the unbalancing of the phases but normally held against movement by one of the other windings.

7. The combination with a circuit interrupting device, of means for opening said device upon phase unbalancing comprising a winding corresponding to each phase of said circuit, a single armature member movable in response to each winding, a common tripping member for said device, and means whereby the actuation of any of said movable members in response to their respective windings will operate said tripping member, said windings being located intermediate said armature members so that each armature normally held against movement by one of said other windings.

8. The combination with a polyphase circuit, of means for opening the same comprising a control switch, means for tripping said control switch including a coil in each phase of said polyphase circuit, magnetic members pivotally disposed intermediate said coils, each of said members being held in normal position by one of said coils but arranged to individually operate said tripping device upon unbalancing of said phases.

9. The combination with a circuit interrupting device, of means for opening said device upon phase unbalancing comprising a winding corresponding to each phase of said circuit, a single armature member movable in response to each winding, a tripping member operatively related to all said movable members and adapted to be moved to trip said interrupting device in response to the actuation of any of said movable members, said windings being so arranged relative to said armature members that each armature is held in normal position by one of said other windings.

10. The combination with a polyphase circuit of means for opening the same upon the unbalancing of the phases comprising a magnetizing winding for each phase, an independent armature for each phase positioned to be influenced by two of said windings and normally held in position by one of said windings, and a switch operating member moved in response to the actuation of any one of said armatures upon its actuation by the other of said windings.

In witness whereof, I have hereunto set my hand this 12th day of July, 1917.

CHARLES B. LARZELERE.